(12) United States Patent
Vajo et al.

(10) Patent No.: US 12,548,782 B1
(45) Date of Patent: Feb. 10, 2026

(54) SALT WATER ELECTROLYTE BATTERY

(71) Applicant: HRL LABORATORIES, LLC, Malibu, CA (US)

(72) Inventors: John Vajo, Malibu, CA (US); Jason Graetz, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 745 days.

(21) Appl. No.: 17/815,547

(22) Filed: Jul. 27, 2022

Related U.S. Application Data

(60) Provisional application No. 63/330,581, filed on Apr. 13, 2022.

(51) Int. Cl.
| | | |
|---|---|---|
| *H01M 6/34* | (2006.01) | |
| *H01M 4/06* | (2006.01) | |
| *H01M 4/42* | (2006.01) | |
| *H01M 6/04* | (2006.01) | |
| *H01M 4/46* | (2006.01) | |

(52) U.S. Cl.
CPC ............ *H01M 6/34* (2013.01); *H01M 4/06* (2013.01); *H01M 4/42* (2013.01); *H01M 6/04* (2013.01); *H01M 6/045* (2013.01); *H01M 4/463* (2013.01); *H01M 4/466* (2013.01)

(58) Field of Classification Search
CPC .......... H01M 6/34; H01M 6/04; H01M 6/045; H01M 4/06; H01M 4/466; H01M 4/463; H01M 4/42
See application file for complete search history.

(56) References Cited

U.S. PATENT DOCUMENTS

| | | |
|---|---|---|
| 10,396,418 B2 | 8/2019 | McKay et al. |
| 2015/0221956 A1* | 8/2015 | McKay ............... H01M 6/045 429/119 |

OTHER PUBLICATIONS

Abner Brenner, Cells with Sodium Hypochlorite or Chlorite and Anodes of Magnesium or Aluminum, Journal of The Electrochemical Society, Oct. 1996, pp. 3133-3138, vol. 143, No. 10, The Electrochemical Society, Inc.
Andres M. Cardenas-Valencia et al., Recent Developments of Semi-fuel Cells for Powering Underwater Sensors and Platforms, ECS Transactions, 2010, pp. 417-429, vol. 26, No. 1, The Electrochemical Society.
B.M.L. Rao et al., Aluminum—Sea Water Battery for Undersea Vehicle, Proceedings of the 6th International Symposium on Unmanned Untethered Submersible Technology, Durham, New Hampshire, 1989, pp. 100-108, Durham, New Hampshire.
Maria G. Medeiros et al., Investigation of a Sodium Hypochlorite Catholyte for an Aluminum Aqueous Battery System, J. Phys. Chem. B, 1998, pp. 9908-9914, vol. 102, No. 49, American Chemical Society.

* cited by examiner

*Primary Examiner* — Laura Weiner
(74) *Attorney, Agent, or Firm* — Lewis Roca Rothgerber Christie LLP

(57) ABSTRACT

An electrochemical cell includes a cathode including a porous scaffold and catalyst on the porous scaffold, an anode spaced apart from the cathode, a first liquid composition separated from the anode by the cathode, and a second liquid composition between the anode and the cathode, wherein the first liquid composition includes an electrolyte and a salt, the salt including a cation and a first anion, the first anion being electrochemically reduced to a second anion when flowing through the cathode, and the second liquid composition includes the electrolyte and the second anion.

14 Claims, 15 Drawing Sheets

SALT WATER ELECTROLYTE BATTERY

CROSS-REFERENCE TO RELATED APPLICATION

The present application claims priority to and the benefit of U.S. Provisional Application No. 63/330,581, filed on Apr. 13, 2022, the entire content of which is incorporated herein by reference.

FIELD

The present disclosure relates generally to a electrochemical cell that utilizes salt water, for example, seawater, as the electrolyte.

BACKGROUND

Unlike related art batteries with an organic liquid electrolyte, which may be prone to problems such as ignition of the electrolyte, batteries utilizing salt water as the electrolyte has substantially eliminated any risk of catching fire. Furthermore, high energy batteries with high specific energy or gravimetric energy density (Wh/kg) and/or high volumetric energy density (Wh/L) for underwater applications are constantly in demand. In order to increase the specific energy and/or volumetric energy density of batteries that operate underwater in saline environments (e.g., seawater), the surrounding, freely available, seawater has been utilized as an electrolyte. The salt water batteries additionally have the benefit of releasing innocuous discharge products.

FIG. 1 schematically illustrates a salt water battery. Referring to FIG. 1, a salt water battery may include a metal anode 110, a salt water electrolyte 130, a cathode 150, and a cathode active material (also referred to as catholytes) 170 soluble in the salt water electrolyte 130. During the operation of the battery, the anode 110 is oxidized and releases electrons, the cathode active material 170 is mixed with the salt water electrolyte 130 and a portion of it is electrochemically reduced when passing by the cathode 150 to form electrochemically inactive anions. The electrolyte 130 carries the electrochemically inactive anions to the anode 110 to complete the circuit. However, as the mixture 190 of the cathode active material 170 and the salt water electrolyte 130 flows by the cathode 150, a portion of the cathode active material 170 that is not electrochemically reduced is in direct contact with the anode 110 and may chemically react with the anode 110. Such reactions may lead to internal shorting of the battery, reduce the amount of anode active material for power generation and may also corrode the anode 110. Therefore, the battery efficiency may be reduced as a result.

In the related art batteries, the cathode 150 carries electrocatalysts that are often optimized to operate at a high pH (e.g., in alkaline electrolyte solutions). This necessitates carrying a concentrated alkali solution to mix with the seawater, adding weight and thereby reducing the specific energy. Furthermore, at a high pH, one or more of the dissolved metal cations in seawater will likely precipitate as metal hydroxides, which would clog any porous structure when the mixture 190 flows through the pores of the cathode 150.

The above information disclosed in this Background section is only for enhancement of understanding of the background of the invention and therefore it may contain information that does not constitute prior art.

SUMMARY

According to one or more embodiments of the present disclosure, an electrochemical cell includes a cathode including a porous scaffold and catalyst on the porous scaffold, an anode spaced apart from the cathode, a first liquid composition separated from the anode by the cathode, and a second liquid composition between the anode and the cathode, wherein the first liquid composition includes an electrolyte and a salt, the salt including a cation and a first anion, the first anion being electrochemically reduced to a second anion when flowing through the cathode, and the second liquid composition includes the electrolyte and the second anion.

In an embodiment, the cathode has a first surface facing the first liquid composition and a second surface facing the second liquid composition, and an amount of the first anion decreases from the first surface to the second surface.

In an embodiment, in the second liquid composition, a molar ratio between the first anion and the second anion is from 0:100 to 10:90.

In an embodiment, the electrolyte includes seawater.

In an embodiment, a pH of the second liquid composition is in a range of 5 to 8.

In an embodiment, a porosity of the porous scaffold is 40% to 98%, based on a total volume of the porous scaffold.

In an embodiment, the catalyst of the cathode includes Pt and/or Ir.

In an embodiment, a surface area of the catalyst of the cathode is 500 cm$^2$ or greater per each cm$^2$ of a geometric surface area of the cathode.

In an embodiment, the anode includes magnesium (Mg), aluminum (Al), and/or zinc (Zn).

In an embodiment, the first anion includes peroxide ($O_2^{2-}$), persulfate ($S_2O_8^{2-}$), hypochlorite ($OCl^-$), chlorite ($ClO_2^-$), chlorate ($ClO_3^-$), bromite ($BrO_2^-$), bromate ($BrO_3^-$), and/or iodate ($IO_3^-$).

In an embodiment, the second anion includes $SO_4^{2-}$, $Cl^-$, $Br^-$, $I^-$, and/or $OH^-$.

In an embodiment, the porous scaffold is 1 mm to 100 mm in thickness.

In an embodiment, the electrocatalytic scaffold is an ordered microtruss structure or a carbon aerogel structure.

In an embodiment, the electrochemical cell further includes a pump structure configured to pass the first liquid composition though the porous scaffold.

According to one or more embodiments of the present disclosure, a method of operating an electrochemical cell includes feeding a first liquid composition to a cathode, the first liquid composition including an electrolyte and a first anion, and the cathode including an electrocatalytic scaffold; reducing the first anion to a second anion in the electrocatalytic scaffold; and flowing a second liquid composition from the cathode toward an anode, the second liquid composition including the electrolyte and the second anion.

In an embodiment, all first liquid composition is fed to flow through the electrocatalytic scaffold of the cathode.

In an embodiment, in the second liquid composition, a molar ratio between the first anion and the second anion is from 0:100 to 10:90.

In an embodiment, the first anion includes peroxide ($O_2^{2-}$), persulfate ($S_2O_8^{2-}$), hypochlorite ($OCl^-$), chlorite ($ClO_2^-$), chlorate ($ClO_3^-$), bromite ($BrO_2^-$), bromate ($BrO_3^-$), and/or iodate ($IO_3^-$).

In an embodiment, the electrolyte includes seawater.

In an embodiment, the method further includes passing the first liquid composition though the electrocatalytic scaffold by utilizing a pump structure.

BRIEF DESCRIPTION OF THE DRAWINGS

These and other features and enhancements of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
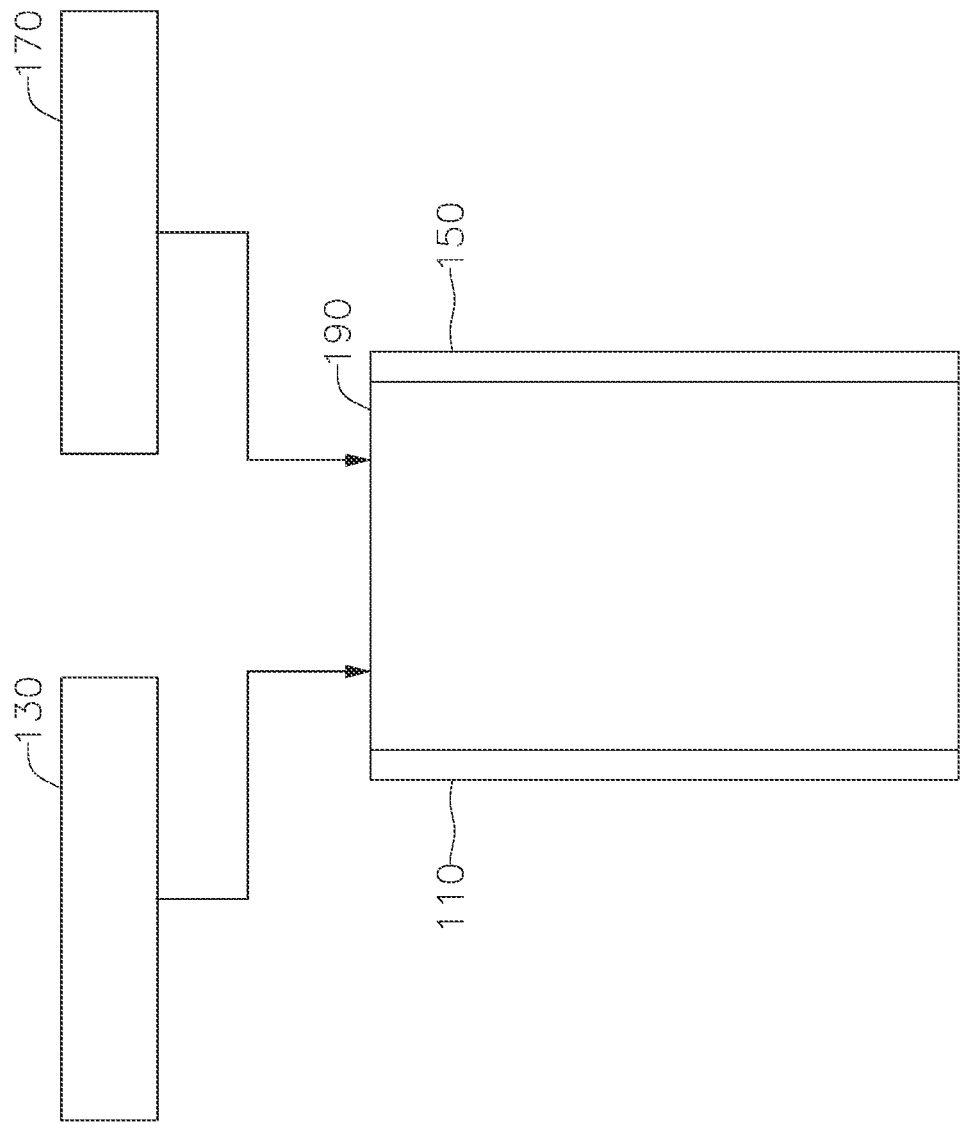
FIG. 1 is a schematic illustration of a related art electrochemical cell.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

The use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. The term "diameter" as used herein may refer to the diameter of a circular or spherical shape, or the equivalent diameter of a non-circular or non-spherical shape.

According to embodiments of the present disclosure, an electrochemical cell includes a cathode including a porous scaffold and catalyst (i.e., electrocatalyst) on the porous scaffold, an anode spaced apart from the cathode, an aqueous electrolyte, and a cathode active material dissolved in the aqueous electrolyte. The aqueous electrolyte may include NaCl dissolved in water. In some embodiments, the aqueous electrolyte is substantially seawater. The cathode active material may be a salt including a cation and an electrochemically active anion capable of being reduced to an electrochemically inactive anion when in contact with the electrocatalyst. The aqueous electrolyte and the cathode active material dissolved therein forms a first mixture (e.g., a first liquid composition). In the first mixture, an amount of the cation and an amount of the first anion of the salt are in stoichiometric balance. The first mixture passes through the pores in the cathode, where substantially all the electrochemically active anions are reduced to the electrochemically inactive anions when emerging out of the cathode into the space between the anode and the cathode. That is, substantially all of the cathode active material are reduced when it comes in contact with the anode.

Figure 2:
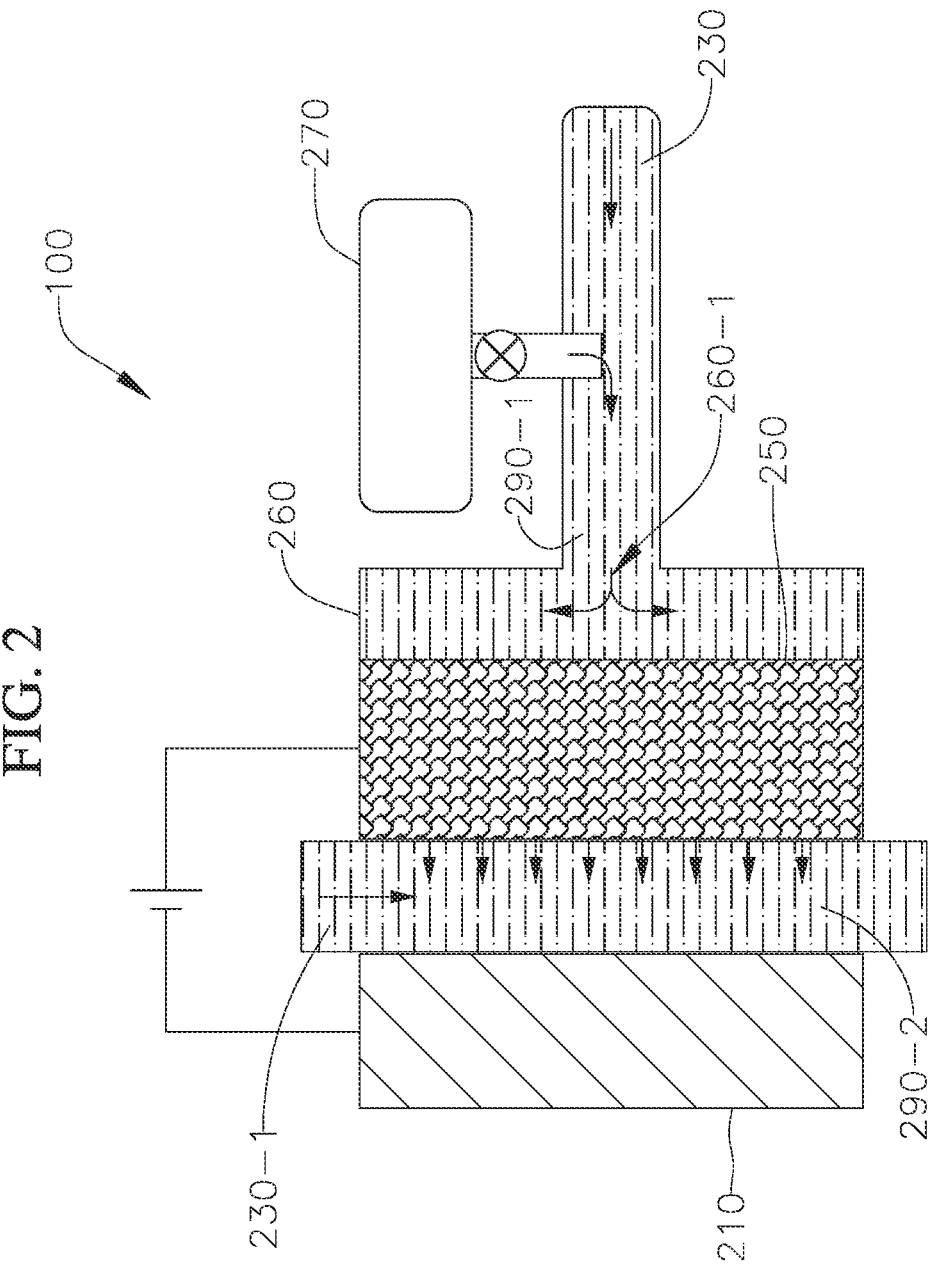
FIG. 2 is a schematic illustration of an electrochemical cell according to an embodiment of the present disclosure.

FIG. 2 is a schematic illustration of an electrochemical cell 100 according to an embodiment of the present disclosure. Referring to FIG. 2, the electrochemical cell 100 includes a metal anode 210, a salt water electrolyte 230, a cathode 250, and a cathode active material 270 soluble in the salt water electrolyte 230. Throughout the current disclosure, the "cathode active material" is also referred to as the "catholytes", and the two terms are used interchangeably. In a space separated from the anode 210, the cathode active material 270 is mixed with the salt water electrolyte 230 to form a first mixture 290-1. The first mixture 290-1 is separated from the anode 210 by the cathode 250. In an embodiment, the electrochemical cell 100 further includes a casing 260 encasing the cathode 250 and having an opening 260-1 as an inlet for the first mixture 290-1 to flow into the electrochemical cell 100. Once entering through the inlet 260-1, the casing 260 restricts and directs the first mixture 290-1 to only flow through the pores of the cathode 250 before flowing toward the anode 210. The cathode active material 270 in the first mixture is a salt including a cation and an electrochemically active anion capable of being reduced to an electrochemically inactive anion. When the first mixture flows through the cathode 250 (e.g., by entering through a first surface of the cathode 250 and flowing through the space between the first surface and a second surface facing oppositely away from the first surface), the electrochemically active anion of the cathode active material 270 is reduced to an electrochemically inactive anion by the catalyst on the porous scaffold of the cathode 250. According to embodiments of the present disclosure, the casing 260 ensures no significant portion of the first mixture 290 can bypass the porous cathode 250 to come in contact with the anode 210 before substantially all the electrochemically active anions are reduced to the electrochemically inactive anions. The salt water electrolyte 230 mixed with the electrochemically inactive anion forms a second mixture 290-2, and the second mixture 290-2 emerges from the cathode 250 (e.g., from the second surface of the cathode 250) into the space between the anode 210 and the cathode 250 and supplies the electrochemically inactive anions to the anode 210 to complete the circuit. That is, in the electrolyte solution that comes in contact with the anode 210, all or substantially all of the electrochemically active anions of the cathode active material 270 have been completely or substantially completely reduced to electrochemically inactive anions. Therefore, the undesirable side reactions between the anode 210 and the electrochemically active anions of the cathode active material 270 is prevented or substantially prevented from happening. The second mixture 290-2 is different from the first mixture 290-1 in that the anions from the cathode active material 270 are completely or substantially completely reduced to electrochemically inactive anions. In an embodiment, an amount of the first anion in the space between the first surface and the second surface of the cathode decreases from the first surface to the second surface. For example, the amount of the first anion decreases from the first surface towards the second surface, and/or across the thickness direction of the cathode from the first surface towards the second surface. In an embodiment, in the second mixture 290-2, a molar ratio between the electrochemically active anions of the cathode active material and the electrochemically inactive anions is from 0:100 to 10:90. The second mixture 290-2 may further include electrooxidation products of the anode material. In some embodiments, additional salt water electrolyte 230-1 not including the cathode active material 270 may be introduced to the electrochemical cell 100 (e.g., the space between the anode 210 and the cathode 250) through a path different from the path the first mixture 290-1 takes, e.g., without passing through the catalyst on the porous scaffold of the cathode 250 to facilitate material and ion transportation and/or the like.

Unlike the device of the related art shown in FIG. 1, where the salt water 130 and catholyte 170 mixture flows by the cathode 150, in the electrochemical cell according to embodiments of the present disclosure, the mixture flows through the cathode 250. That is, in the related art device, a portion of the salt water 130 and catholyte 170 mixture does not come in contact with the cathode 150 when it flows by the cathode 150 and some of the electrochemically active anions of the cathode active material 170 have not been reduced by the catalyst within the cathode 150 when they come in contact with the anode 110. As such, the related art device may have short circuit and/or deteriorated efficiency. In contrast, in the electrochemical cell according to embodiments of the present disclosure, the salt water 230 and catholyte 270 mixture has to flow through the cathode 250 before it comes in contact with the anode 210. Here, the term "flow through" refers to that the mixture flows through the pores of the porous cathode 250 to reach the anode 210 without by-passing the porous cathode 250 from over the top, the bottom or any other sides thereof. This way, all or substantially all of the electrochemically active anions of the cathode active material 270 have been completely or substantially completely reduced to electrochemically inactive anions when they come in contact with the anode 210, and the battery efficiency and battery lifespan may be improved.

In some embodiments, the salt water electrolyte 230 may include seawater, the anode 210 may include a low standard-reduction-potential metal, the cathode active material 270 may be a flowable cathode material including a high standard-reduction-potential soluble anion, and the cathode 250 may include a porous electrocatalytic scaffold to enable the complete or substantially complete reduction of the electrochemically active anions of the cathode active material 270 into the electrochemically inactive anions. Throughout the specification, the complete or substantially complete reduction of the electrochemically active anions of the cathode active material 270 into the electrochemically inactive anions is also referred to as depletion of the electrochemically active anions. The structure of the cathode 150 enabling the depletion of the electrochemically active anions is referred to as a depletion-flow cathode electrode structure. The depletion-flow design eliminates direct chemical interaction of the cathode active material with the metal anode, thereby eliminating chemical short circuiting of the battery.

In some embodiments, the cathode active material 270 mixed with the salt water electrolyte 230 flows completely and solely through the porous electrocatalytic scaffold structure of the cathode 250 toward the anode 210. In an embodiment, the space between the anode 210 and the cathode 250 is in fluid communication with the first mixture 290-1 only through the porous electrocatalytic scaffold structure of the cathode 250. For example, the cathode 250 has a front side facing the anode 210, and the first mixture 290-1 is only feed through the back side of the cathode 250 facing oppositely away from the front side. The first mixture 290-1 comes in contact with the catalysts on the porous electrocatalytic scaffold structure of the cathode 250, where the electrochemically active anions of the cathode active material 270 are reduced into the electrochemically inactive anions when flowing out into the space between the front side of the cathode 250 and the anode 210. That is, the electrochemically active anions of the cathode active material 270 are substantially completely electrochemically reacted before the flow leaves the cathode structure and impinges on the anode to close the ionic electrical circuit within the battery. Thus, only electrochemically inactive cathode anion reaction products reach the anode 210. While the first mixture 290-1 is shown to be introduced through the back side of the cathode 250 in FIG. 2, embodiments of the present disclosure are not limited thereto. For example, the inlet for the first mixture 290-1 may be on the top side, bottom side, or other sides of the cathode 250 as long as the only path the first mixture 290-1 may come in contact with the anode 210 is through the pores of the cathode 250. That is, the first mixture 290-1 is separated from the anode 210 by the cathode 250, and the first mixture 290-1 has to flow through the pores of the cathode 250 before coming in contact with the anode 210, by which time it was transformed into the second mixture 290-2.

The cathode 250 has a porous scaffold with electrocatalysts on the surface of the porous scaffold of the cathode 250. In an embodiment, the cathode 250 includes a porous carbon aerogel impregnated with electrocatalytic platinum (Pt) nanoparticles.

In an embodiment, the porous cathode has a microtruss structure. A microtruss structure is an ordered three-dimensional structure at the micrometer scale. A microtruss structure includes a plurality of first truss elements extending along a first direction; a plurality of second truss elements extending along a second direction; and a plurality of third truss elements extending along a third direction. The first, second, and third truss elements interpenetrate each other at a plurality of nodes to form a continuous material. U.S. Pat. No. 7,382,959 B1 (Optically Oriented Three-Dimensional Polymer) discloses such microtruss structures and methods of making the same, the entire content of which is incorporated herein by reference. In an embodiment, the catalyst is deposited on an outer surface of the truss elements. In another embodiment, the truss elements each have a hollow core, and the catalyst is deposited on an inner surface and/or the outer surface of the truss elements.

In an embodiment, the electrocatalyst is evenly distributed throughout cathode porous scaffold. In another embodiment, there is a gradient in the catalyst density/loading throughout the cathode porous scaffold, e.g., along a thickness direction from the back side of the cathode 250 where the catholyte enters the cathode 250 toward the front side of the cathode 250 where the catholyte leaves the cathode 250 into the space between the anode 210 and the cathode 250. In an embodiment, the type or kind of the catalyst is varied, either continuously or in discrete steps, throughout the cathode porous structure. For example, platinum alloy may be utilized in the region where the catholyte enters the cathode 250 and pure platinum may be utilized in the region closer to the anode 210.

Examples of low standard-reduction-potential metals as suitable anode materials may include magnesium (Mg), aluminum (Al), and zinc (Zn). Examples of high-standard-reduction soluble cathode active materials may include an electrochemically active anion capable of being reduced to an electrochemically inactive anion such as peroxide ($O_2^{2-}$), persulfate ($S_2O_8^{2-}$), hypochlorite ($OCl^-$), chlorite ($ClO_2^-$), chlorate ($ClO_3^-$), and/or the bromine and iodine analogues including bromite ($BrO_2^-$), bromate ($BrO_3^-$), and/or iodate ($IO_3^-$). For the required electroneutrality, the cathode active material may be a salt including the above described anions and any suitable cation, examples thereof may include hydrogen ($H^+$), lithium ($Li^+$), sodium ($Na^+$), ammonium ($NH_4^+$ or $NR_4^+$), and potassium ($K^+$).

As shown in FIG. 2, salt water (e.g., seawater) 230 is taken in as an electrolyte and mixed with a concentrated solution of a soluble cathode active material 270 to form a first mixture 290-1. This first mixture 290-1 is flowed through the porous cathode (i.e., the porous cathode electrode) 250. The porous cathode 250 is designed such that substantially complete electrochemical reduction of the electrochemically active anion of the soluble cathode active material 270 occurs within the pores and before the first mixture 290-1 flows into the space between the anode 210 and the cathode 250. Upon exiting the porous cathode 250, the second mixture 290-2 is thus depleted of the electrochemically active anion of the cathode active material 270. The electrochemically active anion depleted second mixture 290-2 then flows over the metal anode 210. Electrochemical oxidation of the metal anode 210 occurs at the metal surface, which completes the ionic circuit of the battery. The electrolyte 230, mixed with products from the reduction of the electrochemically active anion of the soluble cathode active material 270 and the oxidation of the metal anode 210 then flows out of the battery.

In some embodiments, the cathode active material may be stored at a high concentration (e.g., as a liquid, slurry or solid) in a separate tank. The concentrated cathode active material is then combined with incoming salt water such as seawater utilizing any suitable method, such as through a valve, a membrane, an auger or other suitable method to controllably distribute/dose a liquid, slurry, or solid into a flow. A solid cathode active material may also be dosed into salt water to form the catholyte by exposing a surface of the solid cathode active material to the salt water flow where the solubility, surface area and flow rate are tailored such that a desired amount of cathode active material is dissolved into the salt water as it flows across the surface.

In some embodiments, a pump may be utilized to feed the salt water towards the cathode at a desirable flow rate. The pump may be any suitable type or kind of pump. In some embodiments, a filter may be included and the salt water, for example, seawater, may be filtered prior to flowing through the cathode. Actual seawater may include solid particles, trash, and other undesirable materials that may clog the pores of the cathode and may poison the catalyst. By filtering out the unwanted materials before flowing the first mixture through the cathode, the lifespan of the electrochemical cell may be improved.

In an embodiment, a steady flow of salt water (e.g., seawater) may sweep/collect reaction products and release them outside the device being powered by the salt water battery. The reaction products may include the electrochemically inactive anions of the cathode active material as a result of the reduction happened at the cathode and the cations of the anode material as a result of the oxidization happened at the anode, and may further include reaction products between the cations of the anode material, water, and/or salt cations and anions in the electrolyte. For example, the second mixture 290-2 including the salt water electrolyte 230, the cations and the electrochemically inactive anions of the cathode active material 270, and the cations of the anode material (e.g., as cations or as hydroxides) may flow by the anode 210, and may be discharged out of the battery and out of the device powered by the battery. In an embodiment, the second mixture 290-2 including the salt water electrolyte 230, the cations and the electrochemically inactive anions of the cathode active material 270, and the cations of the anode material may flow by the anode 210, and may be discharged out of the battery into a reservoir. In an embodiment, the second mixture 290-2 including the salt water electrolyte 230, the cations and the electrochemically inactive anions of the cathode active material 270, and the cations of the anode material may flow by the anode 210, and may be further processed through filtering to remove the reaction products from the salt water electrolyte. The salt water electrolyte may then be discharged (e.g., re-released to the ocean where the device is utilized) or re-used (e.g., recycled and utilized to form the first mixture).

The substantially complete electrochemical reaction when the cathode active material 270 flows within the cathode 250 may be achieved by tailoring, without being limited thereto, 1) the thickness of the cathode and the pores, including the pore size, pore size distribution, and/or total pore volume of the porous scaffold; 2) the electrocatalysts, including the species and/or loading contained in the pores; and/or 3) the cathode active material mixed with salt water, including the type or kind of anions, concentration and/or flow rate. These parameters may be selected based on the target current density. In some embodiments, the cathode may have a thickness of about 1 mm to 100 mm in thickness, for example, 5 mm to 20 mm in thickness. In some embodiments, the pores of the cathode may have an average diameter of about 10 micrometers to about 200 micrometers, for example, about 20 micrometers to about 100 micrometers. Here, the average diameter of the pores may be, for example, a median diameter (D50). In some embodiments, the porous scaffold may have a porosity of 40% to 98%, for example, 50% to 80%. In some embodiments, the surface area of the catalyst of the cathode may be 300 $cm^2$ or greater per each $cm^2$ of a geometric surface area of the cathode, for example, 500 $cm^2$ or greater per each $cm^2$ of the geometric surface area of the cathode. In some embodiments, the concentration of the anion of the soluble cathode active material in the first mixture 290-1 may be 0.01 M to 5 M, for example, 0.1 M to 1 M. In some embodiments, the flow rate may be 0.5 $cm^3$/min-$cm^2$-electrode to 10 $cm^3$/min-$cm^2$-electrode. When the thickness of the cathode, the pore size and porosity of the cathode, the surface area of the catalyst of the cathode, the concentration of the anion of the soluble cathode active material and/or the flow rate of the cathode active material satisfies the above described ranges, respectively, substantially complete electrochemical reduction of the cathode active material may be achieved when flowing through the cathode 250.

For a practical application of the battery, a certain current density is desirable. The current density may be defined as current per unit area of the electrode. For an electrode with a planar or substantially planar shape, the current density is represented by the areal density, which is desirably around 1 A/$cm^2$-electrode (Ampere per square centimeter of an electrode surface area) or greater. For example, the desirable electrooxidation current density may be 1 A per 1 $cm^2$ surface area at the planar metal anode electrode, and the desirable electroreduction current density may be 1 A per 1 $cm^2$ geometric surface area at the porous cathode electrode. Throughout the disclosure, the term "geometric surface area" refers to the surface area defined by the length and width of the cathode electrode when it has a rectangular cross-section, or equivalent thereof when the cathode has a circular cross-section or other suitable geometric shapes, and not counting the surface areas added by the porous structure.

For the porous cathode electrode, electrochemical reduction occurs at the surface of the electrocatalysts contained inside the pores. Accordingly, the current density may also be defined by current per unit area of the catalyst. The surface area of the catalyst per geometric area of the electrode (cm²-catalysts/cm²-electrode) can be high (>>1) depending on the specific surface area of the catalyst (cm²-catalyst/g-catalyst) and the areal catalyst loading (g-catalyst/cm²-electrode). For example, for polymer electrolyte membrane (PEM) fuel cell electrodes, the specific surface areas may be about 5×10⁵ cm²-catalyst/g-catalyst and the areal catalyst loading may be about 0.001-0.004 g-catalyst/cm²-electrode. Utilizing 5×10⁵ cm²-catalyst/g-catalyst and 0.001 g-catalyst/cm²-electrode, the electrocatalyst area is about 500 cm²-catalyst/cm²-electrode (5×10⁵ (cm²-catalyst/g-catalyst)×0.001 (g-catalyst/cm²-electrode)). Thus, when an overall current density of 1 A/cm²-electrode (i.e., 1 A per 1 cm² of the geometric surface area of the electrode) is needed, that current density is equivalent to electrochemical reduction current on the surface of the electrocatalyst at a current density of 0.002 A/cm²-catalyst (1 (A/cm²-electrode)/500 (cm²-catalyst/cm²-electrode)) (i.e., 0.002 A per 1 cm² of the surface area of the catalyst).

In selecting the materials for the salt water electrolyte battery, one requirement is that the electrooxidation and reduction current densities can be suitably sustained at the operating conditions of the battery. These conditions may include the temperature, pressure, and soluble anion concentration. Further, usage of salt water (e.g., seawater) as an electrolyte requires that the current densities be achieved in the presence of a mixture of electrolyte components. For example, when seawater is utilized as the electrolyte, it contains about 20 g/liter of chloride anions. While chloride may facilitate the electrooxidation of active metals (such as Al) by dissolving passivating surface oxide layers, chloride may also absorb on the surface of catalytic metals (such as Pt), thereby interfering with the electroreduction reactions. In addition, both electrooxidation and reduction reactions are to happen at or near the natural pH of the seawater electrolyte. When the pH level is higher than about 9, several metal cations in seawater (notably $Mg^{2+}$) will precipitate as metal hydroxides and clog the porous cathode, thereby deteriorating the battery performance.

The amount of anion in the soluble cathode material solution (e.g., the first mixture 290-1) needed to flow through the depletion-flow cathode electrode structure can be estimated based on a desired current, e.g., 1 A/cm²-electrode. For example, with chlorite ($ClO_2^-$) reducing from $Cl^{(3+)}$ to $Cl^{(1-)}$ according to the reaction

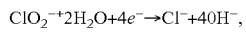

the number of electrons (n) in the anion reduction reaction is n=4. A current of 1 A=1 C/s=6.24×10¹⁸ electrons/s. Then 1 A/cm²-electrode requires a flow of 1.56×10¹⁸ $ClO_2^-$/cm²-s=2.6×10⁻⁶ mol-$ClO_2^-$/cm²-s through the depletion-flow cathode electrode structure (utilizing 1 mole=6.02×10²³). Further, assuming that the concentration (C) of the soluble anion cathode is C=0.1 mol/liter, then the flow rate is 2.6×10⁻⁵ liter/s-cm²-electrode=about 1.6 cm³/min-cm²-electrode. Depending on the soluble anion cathode species, n may be 2 to 8 and the concentration of the soluble anion cathode may be 0.01 M to 5 M, and the flow rate may be suitable adjusted to provide the desired current density.

According to embodiments of the present disclosure, the cathode is sufficiently electron conducting to support a current of about 1 A/cm²-electrode. It is also (at least kinetically) stable in seawater. The porous cathode electrode are also desirably as light weight as possible, in order to enhance or maximize the specific energy and power of the battery. In an embodiment, porous carbon structures are desirable for the light weight, in comparison with metal structures. In an embodiment, conductive porous cathode may be formed utilizing materials including conductive polymers, which may further intrinsically or extrinsically be embedded with metal or carbon fibers or additives; and/or metal-organic frameworks (e.g., Metal-Triazolates).

To provide a current density of 1 A/cm²-electrode and a current density of 0.002 A/cm²-catalyst (the atomic-scale surface area of the electrocatalyst), the corresponding surface area of catalyst in each cm² of the porous cathode electrode is 500 cm². According to embodiments of the present disclosure, the above described catalyst loading may be achieved with pore structures ranging from homogeneous to hierarchical.

In some embodiments, the pore structures of the porous cathode may be homogeneous. In an embodiment, the cathode structure may include (e.g., consist of) an array of uniform cylindrical pores extending through the thickness of the cathode electrode with a layer of catalyst uniformly or substantially uniformly coated on the pore walls. In this case the total catalyst surface area/cm²-electrode would be given by $\pi \cdot d \cdot l \cdot N_p$, where d is the diameter of the pores, I is the length of the pores (equal to the thickness of the electrode), and Np is the numbers of pores per unit geometric surface area. Further, assuming that the total cross-sectional area of the pores (given by $\pi \cdot d^2/4 \cdot N_p$) is 50% of the electrode area, i.e., ½ cm²/cm²-electrode, then Np=2/$\pi \cdot d^2$ and the total catalyst surface area/cm²-electrode=2·l/d. To provide 500 cm²-catalyst/cm²-electrode with l=0.5 cm, d=0.002 cm=20 micrometers. That is, the diameter of the pores is 20 micrometers in order to provide 500 cm²-catalyst/cm²-electrode for a 0.5 cm thick porous cathode with a total cross-sectional area of the pores being 50% of the geometric surface area of the electrode. In some embodiments, the total cross-sectional area of the pores may be from 10% to about 75% (closed-packed) of the geometric surface area of the electrode and the thickness of the porous electrode may be from 1 mm to 100 mm, for example, 5 mm to 10 mm.

In some embodiments, the pore structures of the porous cathode may be hierarchical. The cathode may include (e.g., consist of) a first hierarchical level with random foam structure with low pore surface area and a second hierarchical level coated with a high surface area catalyst. In an embodiment, the first hierarchical level may include a random foam with about 40 pores per cm (about 100 pores per inch, ppi) and about 70% porosity. Such a random foam structure may have a specific surface of about 50 cm²-pore-surface/cm³-foam. For an electrode thickness of 0.5 cm, the pore surface area at this first hierarchical level would be 25 cm²-pore-surface/cm²-electrode. At the second hierarchical level, this surface area may be coated with a high surface area catalyst (such as 5% Pt on carbon XC-72 from FC Catalyst), which has a Pt surface area of 150 m²-Pt/g-Pt (1.5×10⁶ cm²-Pt/g-Pt). At a loading of, e.g., 14 μg-Pt/cm², this coating would give a Pt catalyst surface area of 21 cm²-Pt/cm²-coated-surface or a total of about 525 cm²-Pt/cm²-electrode. Overall, the structure is hierarchical including a hierarchical level in which a low surface area pore structure is coated with a high surface area catalyst layer.

The target electroreduction current density of 0.002 A/cm²-catalyst may be utilized to evaluate candidate anion of soluble cathode materials. In addition to current density, the electrochemical potential of the cathode at which the target current density is attained is desirable to be as high as possible. The higher the potential, the higher the efficiency and possible energy density. The following examples show relevant data for several candidates.

According to embodiments of the present disclosure, a method of operating an electrochemical cell includes the acts or tasks of flowing a first liquid composition through a cathode, the first liquid composition including an electrolyte and a first anion, and the cathode including an electrocatalytic scaffold; electrochemically reducing the first anion to a second anion in the electrocatalytic scaffold; and flowing a second liquid composition toward an anode, the second liquid composition including the electrolyte and the second anion. The first liquid composition is separated from the anode by the cathode, and the second liquid composition is substantially free of the first anion.

Figure 3:
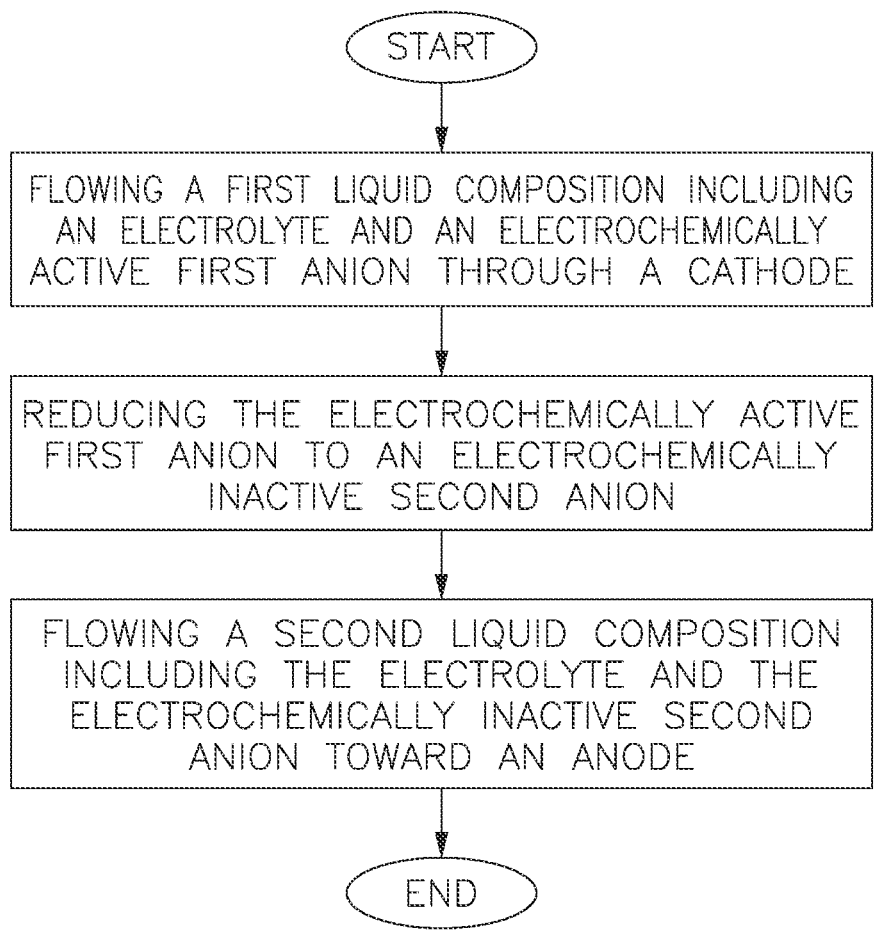
FIG. 3 is a flow chart illustrating a method of operating an electrochemical cell according to an embodiment of the present disclosure.

FIG. 3 is a flow chart illustrating a method of operating an electrochemical cell. Referring to FIG. 3, the method of operating an electrochemical cell includes the act or task of flowing a first liquid composition through a cathode. The first liquid composition includes an electrolyte and a cathode active material dissolved in the electrolyte as a cation and an electrochemically active first anion. The cathode includes a porous scaffold and electrocatalyst on the porous scaffold. In an embodiment, the first liquid composition may be fed to the cathode utilizing a pump. The method further includes the act or task of reducing the electrochemically active first anion to an electrochemically inactive second anion in the electrocatalytic scaffold as the first liquid composition passes through the cathode, and the act or task of flowing a second liquid composition toward an anode. The second liquid composition includes the electrolyte, the cation of the cathode active material and the electrochemically inactive second anion. The first liquid composition is separated from the anode by the cathode, and the second liquid composition is substantially free of the electrochemically active first anion.

In an embodiment, the method may further include the act or task of discharging a third liquid composition. The third liquid composition may include the electrolyte, the cation of the cathode active material, the electrochemically inactive second anion, and a cation of an electrooxidation product of the anode.

In an embodiment, seawater may be utilized as the electrolyte and the method may further include filtering the seawater prior to feeding the first liquid composition through a cathode. Actual seawater may include solid particles, trash, and other undesirable materials that may clog the pores of the cathode and may poison the catalyst. By filtering out the unwanted materials before flowing the first liquid composition may improve the lifespan of the electrochemical cell.

Hereinafter, material selection and design strategy of the electrochemical cell according to embodiments of the present disclosure will be described in more detail with reference to the following examples.

Evaluation of Cathode Active Material

Example 1. Hypochlorite ($OCl^-$) as a Soluble Anion of a Cathode Active Material A commercial bleach solution (Concentrated Disinfecting Bleach, 7.5% sodium hypochlorite, Kroger Co. Cincinnati, OH) was diluted from 8 g to 80 g with deionized water to form a NaOCl solution at about 0.1 M concentration. Commercial bleach products are sold as highly alkaline solutions (about pH 10-11) in order to achieve product stability. Thus, the pH was neutralized to about pH 7 with a few drops of concentrated HCl. Next, 3.2 g of sea salts (Aldrich Chemical #S9883) were added to form a standard 40 g/liter seawater electrolyte. This electrolyte containing about 0.1 M $OCl^-$ as a soluble anion of the cathode active material was tested in a standard 3-electrode electrochemical cell utilizing a Gamry 600+ potentiostat. The working electrode (the electrocatalytic electrode) was a 0.02 cm² Pt disk. The reference electrode was Ag/AgCl and the counter electrode was a Pt/Ir mesh.

Figure 4A:
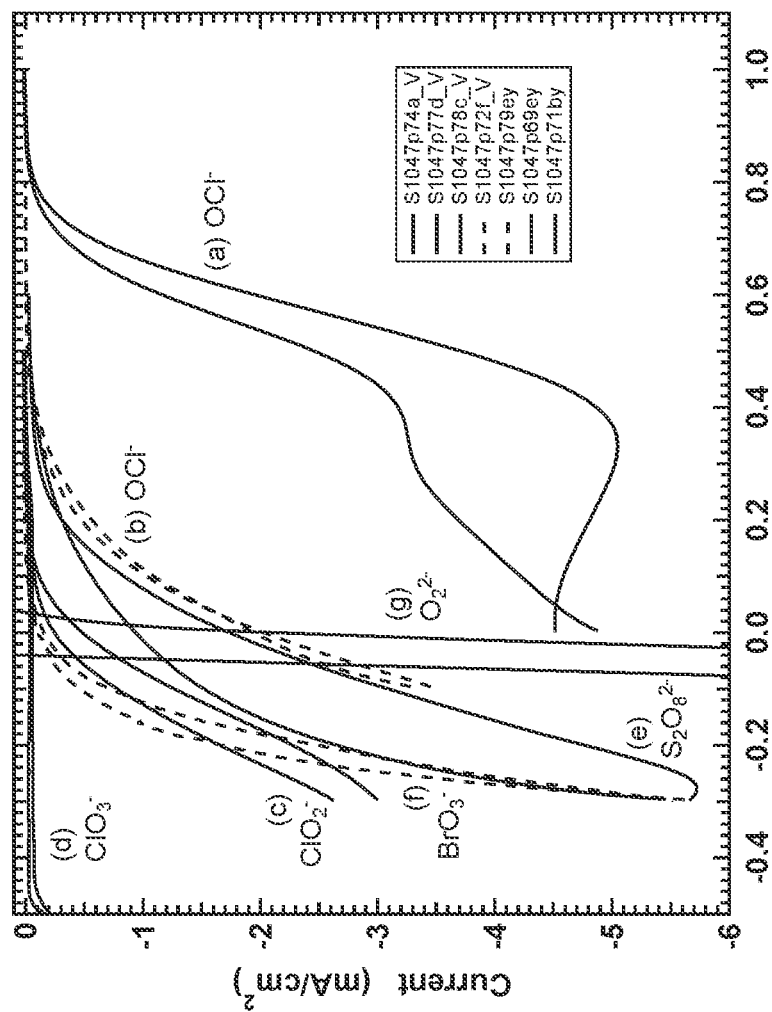
FIG. 4A shows the results of cyclic voltammetry scan of Examples 1 to 5.

FIG. 4A shows the results of cyclic voltammetry scan. In FIG. 4A, curve (a) shows the electroreduction current during a cyclic voltammetry scan from 0 to 1 volt utilizing a sweep rate of 20 mV/sec. With electroreduction currents defined as negative, electroreduction begins below 0.8 V and reaches −2 mA/cm² (i.e., the target current density of 0.002 A/cm²-catalyst) at about 0.5 V.

Example 2. Chlorite ($ClO_2^-$) as a Soluble Anion of a Cathode Active Material 0.74 g $NaClO_2$ (Aldrich #244155) and 3.2 g of sea salts were dissolved in 80 g of deionized water to prepare a seawater electrolyte solution including 0.1 M $ClO_2^-$. The pH of this solution was pH 8. Utilizing the same set-up as described in Example 1, a cyclic voltammetry scan from −0.3 to 0.5 V was conducted and the result is shown as curve (c) in FIG. 4A. As can be seen from FIG. 4A, electroreduction current begins below 0.1 V and reaches -2 mA/cm² at −0.2 V. Thus, electroreduction of $ClO_2$ occurs at lower potentials than for $OCl^-$.

Example 3. Chlorate ($ClO_3^-$) as a Soluble Anion of a Cathode Active Material 0.85 g of $NaClO_3$ (Aldrich #403016) was dissolved in 81 g of deionized water to prepare a solution of about 0.1 M $ClO_3^-$. The pH of this solution was pH 5. To this solution, 3.22 g of sea salts were added. The pH of this solution was pH 7. Utilizing the same set-up as described in Example 1, a cyclic voltammetry scan from −0.5 to 0.5 V was conducted and the result is shown as curve (d) in FIG. 4A. As can be seen from FIG. 4A, electroreduction current begins below-0.45 V and does not reach-2 mA/cm² by −0.5 V. Thus, electroreduction of $ClO_3^-$ occurs at a much lower potential than for $ClO_2^-$.

Example 4. Persulfate ($S_2O_8^{2-}$) as a Soluble Anion of a Cathode Active Material 1.82 g of $NaS_2O_8$ (Aldrich #215589) was dissolved in 77 g of deionized water to prepare a solution of about 0.1 M $S_2O_8^{2-}$. To this solution, 3.2 g of sea salts were added. Utilizing the same set-up as described in Example 1, a cyclic voltammetry scan from −0.3 to 0.5 V was conducted and the result is shown as curve (e) in FIG. 4A. As can be seen from FIG. 4A, electroreduction current begins below 0.4 V and reaches-2 mA/cm² at about −0.1 V. Thus, electroreduction of $S_2O_8^{2-}$ occurs at higher potentials than for $ClO_2^-$.

Example 5. Bromate ($BrO_3^-$) as a Soluble Anion of a Cathode Active Material 1.21 g of $NaBrO_3$ (Aldrich #02151) was dissolved in 80 g of deionized water to prepare a solution of about 0.1 M solution of $BrO_3^-$. The pH of this solution was pH 5-6. To this solution, 3.2 g of sea salts were added. Utilizing the same set-up as described in Example 1, a cyclic voltammetry scan from −0.3 to 0.5 V was conducted and the result is shown as curve (f) in FIG. 4A. As can be seen from FIG. 4A, electroreduction current begins below 0.0 V and reaches −2 mA/cm² at −0.2 V. Thus, electroreduction of $BrO_3^-$ occurs at similar potentials as for $ClO_2^-$.

Figure 4B:
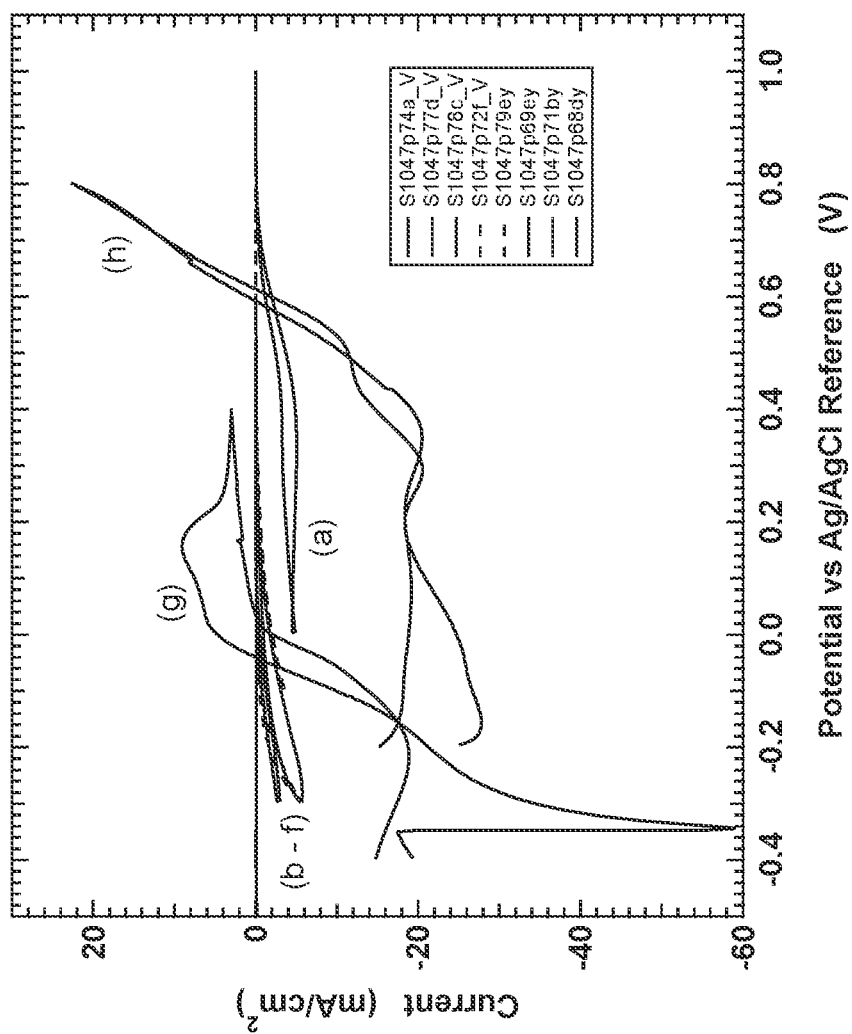
FIG. 4B shows the results of cyclic voltammetry scan of Examples 1 to 5 on a larger scale for the current.

Example 6. Peroxide ($O_2^{2-}$) as a Soluble Anion of a Cathode Active Material 1.5 g of 30 wt % $H_2O_2$ (KMG Electronic Chemicals) was mixed with 80 g of deionized water to prepare a solution of about 0.17 M $O_2^{2-}$. To this solution, 3.2 g of sea salts were added. The pH of this solution was about 7 and was not adjusted further. Utilizing the same set-up as described in Example 1, a cyclic voltammetry scan from −0.4 to 0.4 V was conducted and the result is shown as curve (g) in FIG. 4A. As can be seen from FIG. 4A, the electroreduction current increases (more negative) very rapidly with decreasing potential. The current is-2 mA/cm² at −0.05 V. On a larger scale, as shown in FIG. 4B curve (g), electroreduction begins below about 0 V and reaches comparatively high currents of −20 mA/cm² at −0.2 V.

The onset potential vs. Ag/AgCl reference for Examples 1-6 are listed in Table 1. As shown in Table 1, Examples 1-6 indicate that in salt water electrolyte and at near neutral pH, the potential for the target electroreduction current density of 0.002 A/cm² follows the order from highest to lowest of $OCl^- > S_2O_8^{2-} > O_2^{2-} \sim ClO_2^- \sim BrO_3^- > ClO_3^-$. Based on this order, $OCl^-$ followed by $S_2O_8^{2-}$, $O_2^{2-}$, $ClO_2^-$, etc. appear to provide higher energy density. However, other factors, such as state of catalyst and electrolyte composition may also influence the energy density, as evidenced by the following examples.

TABLE 1

| Example | Anion | Concentration (M) | Potential to reach 0.002 A/cm2 (V) |
| --- | --- | --- | --- |
| 1 | $OCl^-$ | 0.1 | 0.5 |
| 2 | $ClO_2^-$ | 0.1 | −0.2 |
| 3 | $ClO_3^-$ | 0.1 | <−0.5 |
| 4 | $S_2O_8^{2-}$ | 0.1 | −0.1 |
| 5 | $BrO_3^-$ | 0.1 | −0.2 |
| 6 | $O_2^{2-}$ | 0.17 | −0.05 |

Evaluation of Effect of Sea Salt on Electroreduction

Example 7. Effect of History and Composition on Hypochlorite ($OCl^-$) Electroreduction To illustrate the effect of history and composition on hypochlorite ($OCl^-$) electroreduction, a second sample of about 0.1 M $OCl^-$ as a soluble anion of the cathode active material was prepared and tested following substantially the same procedure as in Example 1, and the test result is shown as curve (b) in FIG. 4A. That is, curve (b) shows the electroreduction current during a cyclic voltammetry scan from 0 to 1 volt. For this sample, electroreduction begins below 0.4 V and reaches −2 mA/cm² (0.002 A/cm²-catalyst) at about 0.0 V. Without being bound by any specific theory, the difference in potential of about 0.5 volts (for −2 mA/cm²) between two nominally identical samples (Example 1 and Example 7) may be due to the condition of the surface of the Pt catalyst and may indicate that the electrocatalytic activity of the Pt electrode depends on its history and/or that exposure and reaction of $OCl^-$ may poison the electrocatalytic activity.

Figure 5:
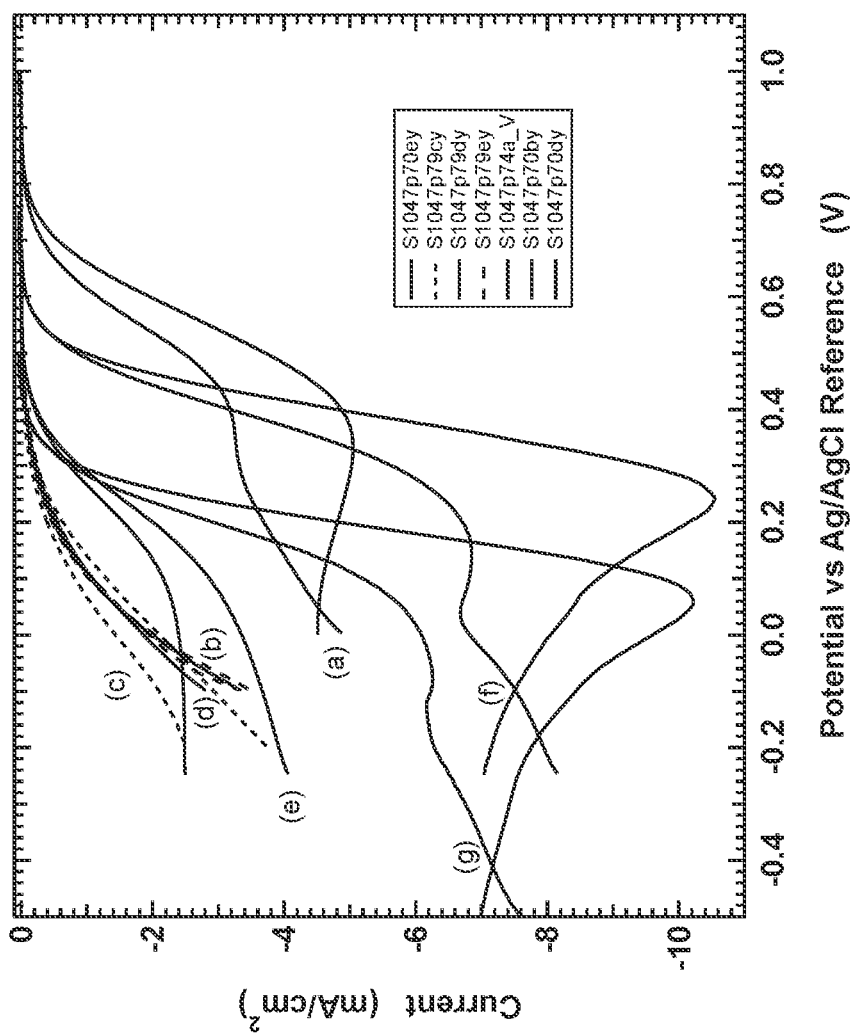
FIG. 5 shows the results of cyclic voltammetry scan of hypochlorite.

To look at the dependence of the reduction current for $OCl^-$ on the condition and history of the Pt catalyst, several $OCl^-$ solutions have been prepared and subjected to cyclic voltammetry scans. The test results are shown in FIG. 5. In FIG. 5, curves (a) and (b) are the same as curves (a) and (b) in FIG. 4A, namely two solutions of about 0.1 M NaOCl in sea salt solution at a pH of about 7. Curve (a) was measured after the 3-electrode electrochemical cell has been utilized to test a sample of $KIO_3$ in deionized water while curve (b) was measured after the 3-electrode electrochemical cell has been utilized to test another $OCl^-$ solution in sea salt solution. Thus, for curve (b), the Pt electrode had been exposed to sea salts for an extended time. Chloride ions ($Cl^-$) are present in sea salt solution at a relatively high concentration (about 20 g/liter, about 0.55 M) and may adsorb on Pt and block catalytic sites. Thus, the different histories of the Pt surface might explain the differences in reduction current and potential for the two nominally identical $OCl^-$ samples (Example 1 and Example 7).

Curves (c) and (d) in FIG. 5 were obtained from substantially the same $OCl^-$ solution prior to obtaining curve (b). Curve (c) was obtained after adjusting the pH of the original alkaline pH of the 0.1 M NaOCl solution to near neutral with about 8 drops of concentrated HCl while curve (d) was obtained after adding 3 additional drops of concentrated HCl from the solution of curve (c) and curve (b) after adding one more additional drop. That is, for the 0.1 M NaOCl solution, the pH was adjusted with about 8 drops of HCL to produce a first solution, and curve (c) shows the cyclic voltammetry scans of this first solution. Then 3 additional drops of concentrated HCL was added to the first solution to produce a second solution, and curve (d) shows the cyclic voltammetry scans of the second solution. Lastly, 1 additional drop of concentrated HCL was added to the second solution to produce a third solution, and curve (b) shows the cyclic voltammetry scans of the third solution.

Curves (b), (c), and (d) are all similar with an onset of reduction at about 0.4 V and a current density of about −2 mA/cm² at about 0.0 V. This similarity indicates that the electrochemical reduction is not particularly sensitive to pH in the near neutral range.

Curve (e) was measured in sea salt solution just after the 3-electrode electrochemical cell has been utilized to measure a $OCl^-$ solution without sea salts. Somewhat similar to the difference between curves (a) and (b), curve (e) shows reduction onset at a higher potential (0.5 V) than curve (b) (0.4 V). However, multiple scans collected with curve (e) showed decreasing activity with each scan. Again, a history in which the previous sample did not contain sea salts suggests that exposure to chloride ions may be reducing the catalytic activity of the Pt.

Consistent with this observation, in a cyclic voltammetry scan of a $OCl^-$ solution without sea salts, curve (f) shows an even higher reduction onset potential of about 0.6 V and much higher current densities, at about 10 mA/cm². The difference between curve (f), with no sea salts, and curve (e), in substantially the same solution except for the addition of sea salts, clearly shows the detrimental influence of sea salts on the electroreduction reaction.

Curve (g) was obtained in a $OCl^-$ solution without sea salts and at a pH of about 12, i.e., before adding concentrated HCl to neutralize the pH of the NaOCl solution at about 0.1 M concentration. The reduction potential is shifted to lower potentials by about 0.2 V. This illustrates the stabilizing effect of an alkaline condition on $OCl^-$ solutions.

Example 8. Effect of Sea Salts on the Electroreduction of Persulfate ($S_2O_8^{2-}$)

Figure 6:
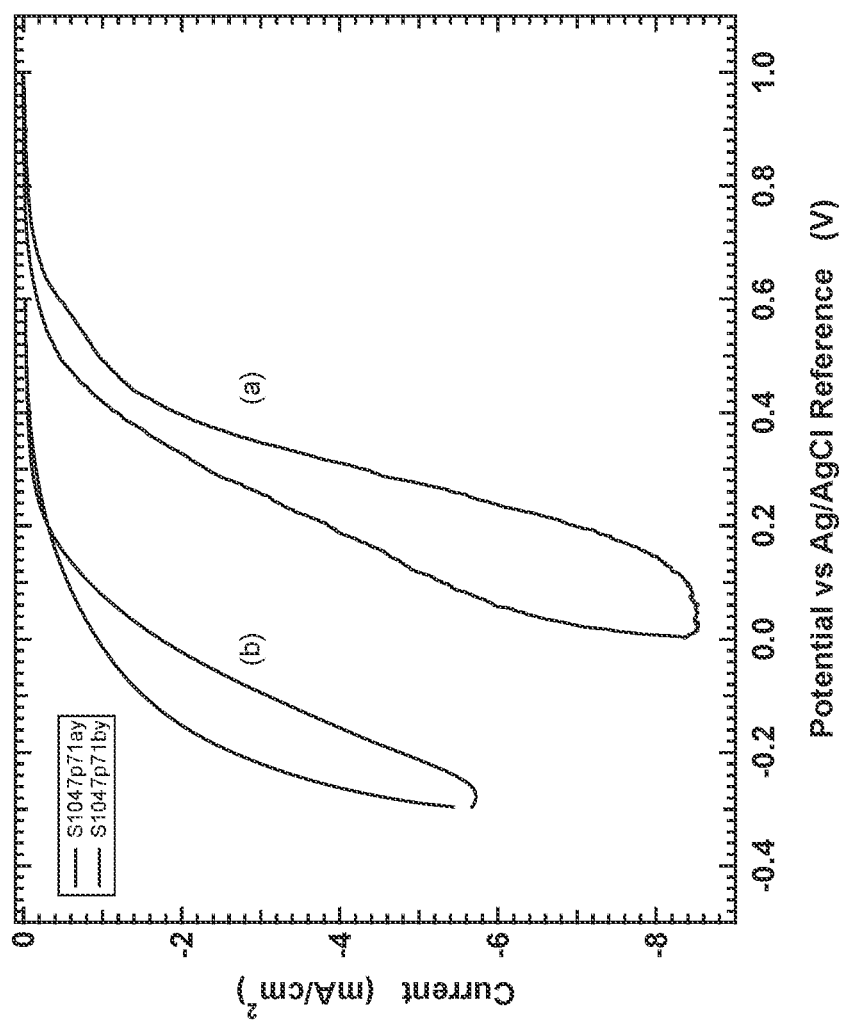
FIG. 6 shows the results of cyclic voltammetry scan of persulfate.

FIG. 6 shows the electroreduction of $S_2O_8^{2-}$ without (curve (a)) and with (curve (b)) sea salts, respectively. The addition of sea salts decreases the reduction potential onset by about 0.4 V, from about 0.5 V to about 0.1 V. This result is consistent with the theory that chloride ion blocks catalytic sites on the Pt electrode surface.

Example 9. Effect of Sea Salts on the Electroreduction of Bromate ($BrO_3^-$)

Figure 7:
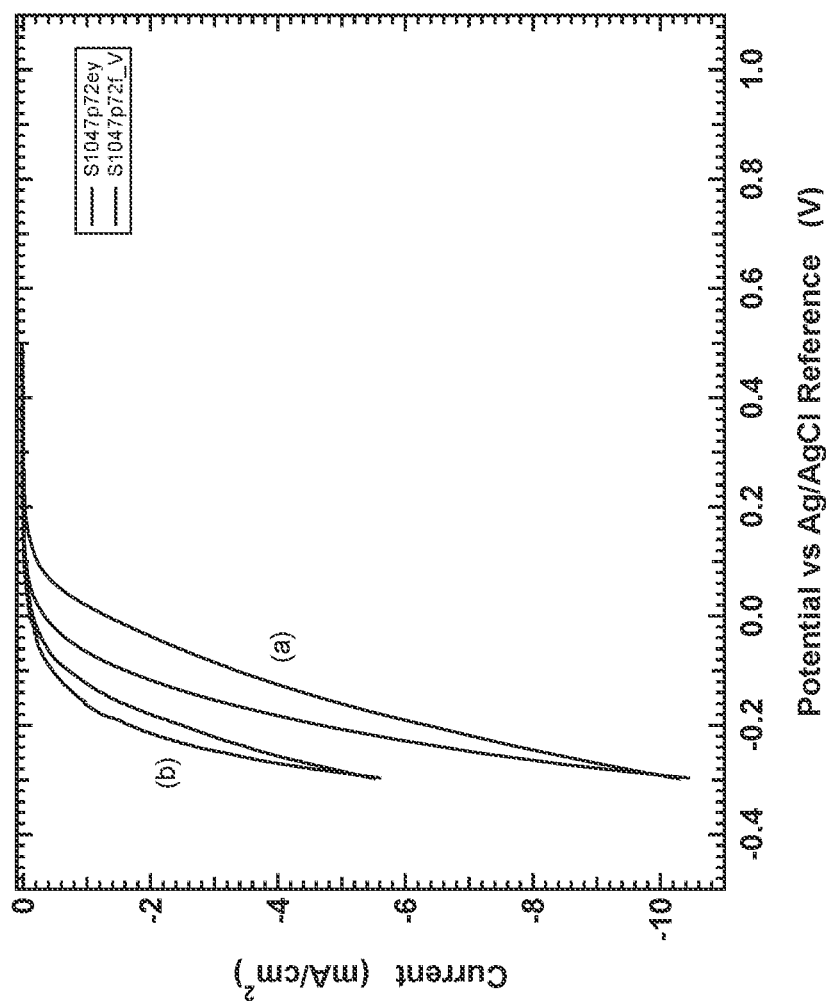
FIG. 7 shows the results of cyclic voltammetry scan of bromate.

FIG. 7 shows the electroreduction of $BrO_3^-$ without (curve (a)) and with (curve (b)) sea salts, respectively. The addition of sea salts decreases the reduction potential onset by about 0.15 V, from 0.15 V to 0.0 V. This result is consistent with the observation that chloride ion blocks catalytic sites on the Pt electrode surface.

The decrease for $BrO_3^-$ is not as large as for persulfate (FIG. 6). This is likely because bromate adsorbs more strongly than persulfate on the Pt and can therefore compete better with adsorbed chloride.

Example 10. Effect of Sea Salts on the Electroreduction of Chlorite ($ClO_2^-$)

Figure 8:
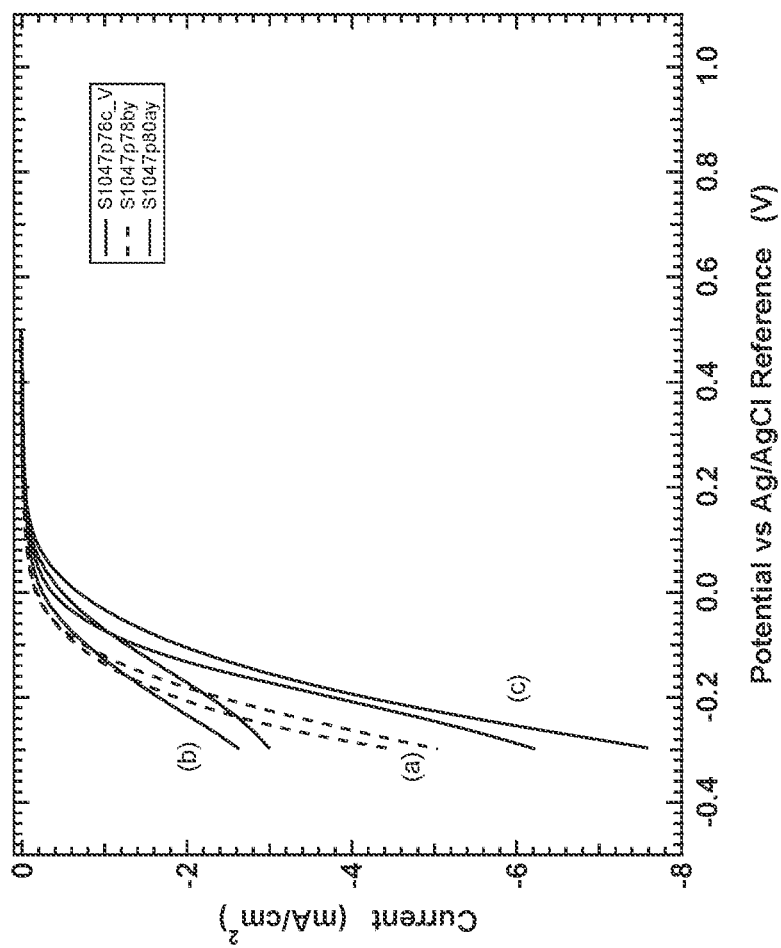
FIG. 8 shows the results of cyclic voltammetry scan of chlorite.

FIG. 8 shows the electroreduction of $ClO_2^-$ without (curve (a)) and with (curves (b) and (c)) sea salts, respectively. Curve (b) in FIG. 8 is the same data (with sea salts) as curve (c) in FIG. 4A. Curve (a) is substantially the same solution as curve (b) but without sea salts (i.e., just before adding the sea salts to the solution utilized to obtain curve (b)). The onset potential for electroreduction and the currents for these curves are similar. This similarity suggests that reduction of $ClO_2^-$ is less affected by sea salts (i.e., chloride) than hypochlorite, persulfate, or bromate. While chlorite may also simply adsorb more strongly (similar to bromate) and thereby better compete with chloride, another possibility is that $ClO_2^-$ can react with adsorbed $Cl^-$ to form 2 $OCl^-$. Without being bound by any particular theory, these possibilities indicate that chlorite may be a more robust soluble anion of a cathode active material. Along this line, another sample of chlorite with sea salts, shown in curve (c) in FIG. 8, actually had higher currents.

Comparison of chlorite ($ClO_2^-$), chlorate ($ClO_3^-$), and bromate ($BrO_3^-$).

Referring to FIG. 4A, the electroreduction of chlorite ($ClO_2^-$), chlorate ($ClO_3^-$), and bromate ($BrO_3^-$) are shown as curves (c) ($ClO_2^-$), (d) ($ClO_3^-$), and (f) ($BrO_3$), respectively. It can be seen from FIG. 4A that the bromate ($BrO_3^-$) is much more reactive than the chlorate, which may indicate better kinetics for bromine-based anions relative to chlorine-based anions. Further, chlorite ($ClO_2^-$) is much more reactive than chlorate ($ClO_3^-$) and does not appear hindered by sea salts. This suggests that bromite ($BrO_2^-$) may be particularly reactive in sea salt electrolyte.

Example 11. Effect of Sea Salts on the Electroreduction of Peroxide ($O_2^{2-}$)

FIG. 4B also shows in curve (h) a cyclic voltammogram from −0.2 to 0.8 V for a 0.2 M solution of $H_2O_2$ in a 0.2 M $H_2SO_4$ acidic electrolyte. In this case, no sea salt is included and the electroreduction begins at below about 0.6 V. The current shows reversible behavior (i.e., overlapping currents for forward and reverse scan directions) from 0.4 to 0.8 V.

Figure 9:
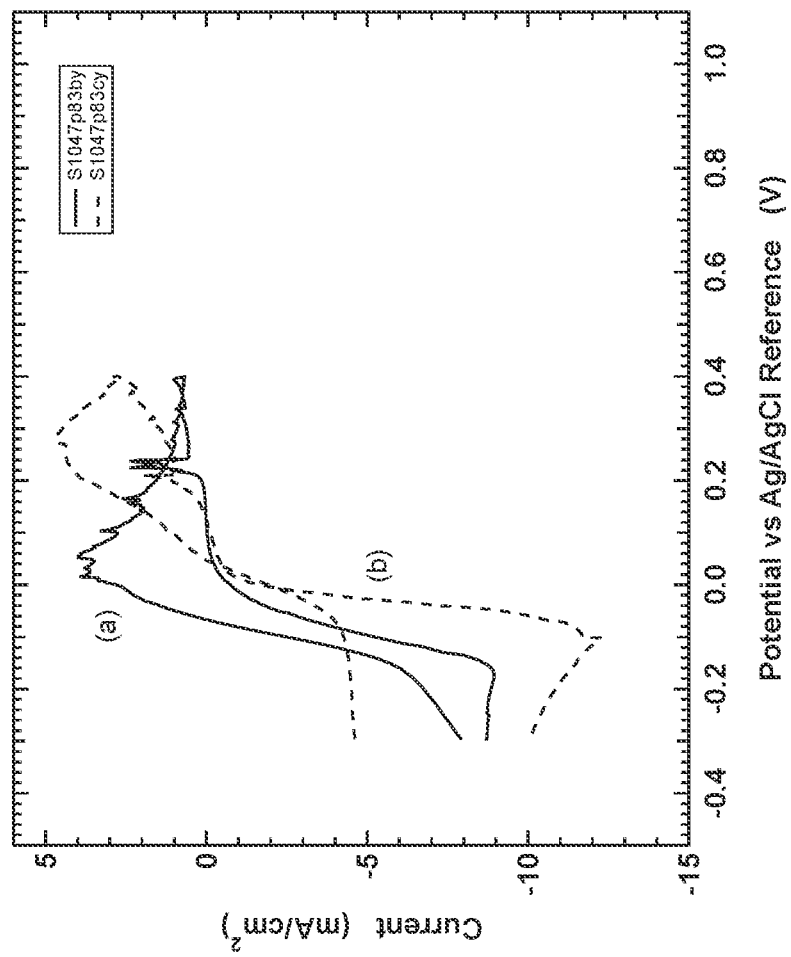
FIG. 9 shows the results of cyclic voltammetry scan of peroxide in sulfate and sea salt electrolytes, respectively.

To illustrate the influence of sea salts (i.e., chloride) on the electroreduction of peroxide, cyclic voltammetry scans were obtained for an about 0.1 M solution of $O_2^{2-}$ with 1) 0.5 M $Na_2SO_4$ aqueous solution (curve (a)) and 2) sea salt aqueous solution (curve (b)) as electrolytes. The results are shown in FIG. 9. With 0.5 M $Na_2SO_4$ electrolyte, electroreduction begins at about-0.1 V while it begins at 0.0 V in sea salt solution. The increased (i.e., improved) electroreduction in sea salt solution indicated that chloride does not inhibit the reduction of peroxide. Although speculatively, peroxide may potentially react chemically with chloride to form hypochlorite, which is more easily reduced electrochemically.

Example 12. Electrooxidation of Aluminum Alloy Anode

Figure 10:
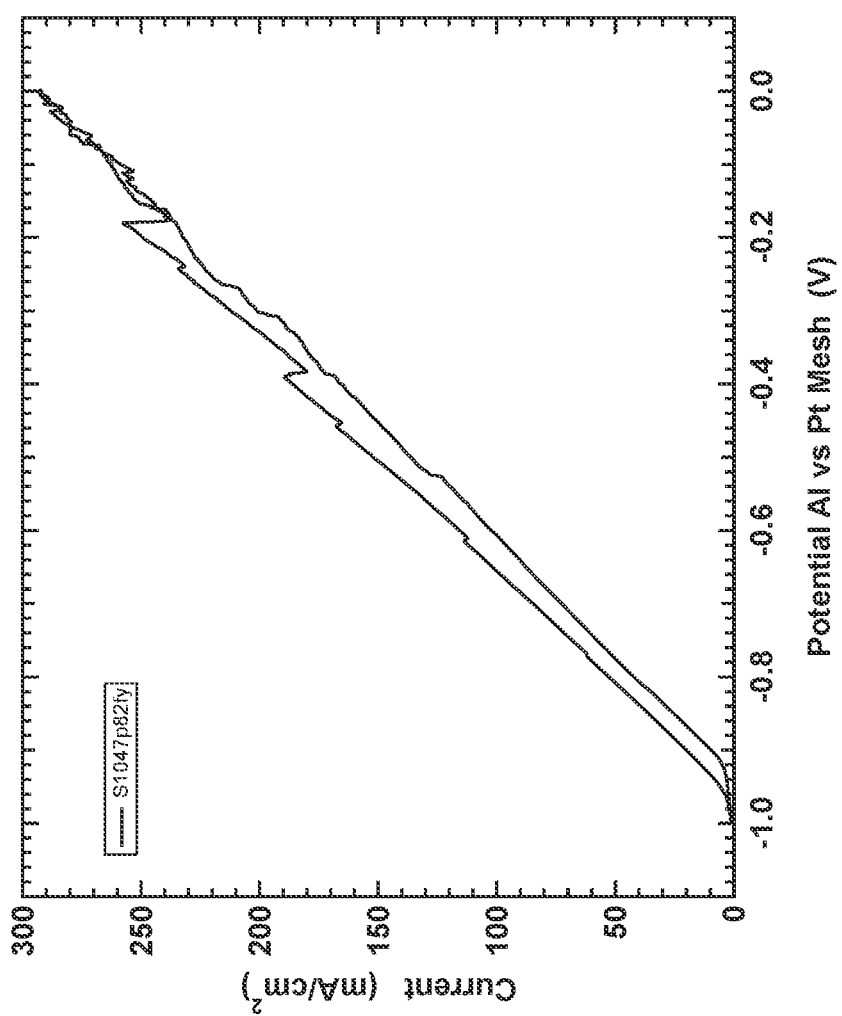
FIG. 10 shows the results of cyclic voltammetry scan of an aluminum alloy.

An aluminum alloy that is utilized as a sacrificial anode (Navalloy, Performance Metals, Inc., Bechtelsville, PA) was evaluated as a low standard-reduction-potential metal anode material and anode electrode structure. A block of Al Navalloy was polished with 240, 320, and 600 grit SiC grinding paper. The sample was mounted in a flat cell with 0.0285 $cm^2$ area exposed to a 40 g/liter sea salt electrolyte. The open circuit voltage vs a Pt mesh counter electrode (with a least 10× more surface area) was −1.27 V. The electrooxidation current was measured utilizing cyclic voltammetry with scanning from −1.0 to 0.0 V. The results from a representative scan are shown in FIG. 10. As can be seen from FIG. 10, oxidation begins at about −0.95 V, indicating an overpotential of 0.32 V. At—0.2 volts, the current density is about 250 mA/$cm^2$. This is somewhat lower than the anode benchmark of 1 A/$cm^2$. The close retracing of the current on the positive and negative direction scans indicates reversible behavior without passivation. The linear increase, as opposed to an exponential increase, possibly suggests a resistance (i.e., IR drop) limited current.

Figure 11:
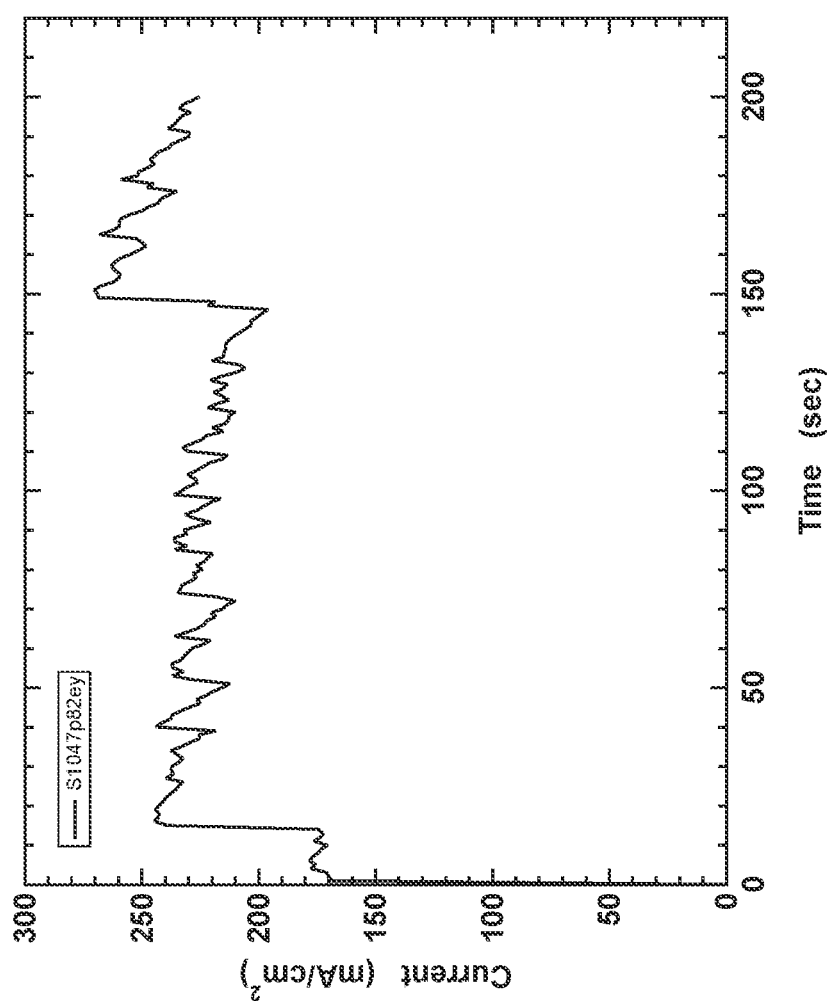
FIG. 11 shows the results of constant potential electrooxidation of an aluminum alloy.

FIG. 11 shows a constant potential electrooxidation at −0.2 V for 200 sec. As can be seen from FIG. 11, the current is overall stable, varying from about 200 to 250 mA/$cm^2$. The sawtooth oscillations may originate from gas bubbles forming on and leaving the alloy surface.

Example 13. Aluminum Alloy Anode/Soluble Anion Cathode Cells

Figure 12:
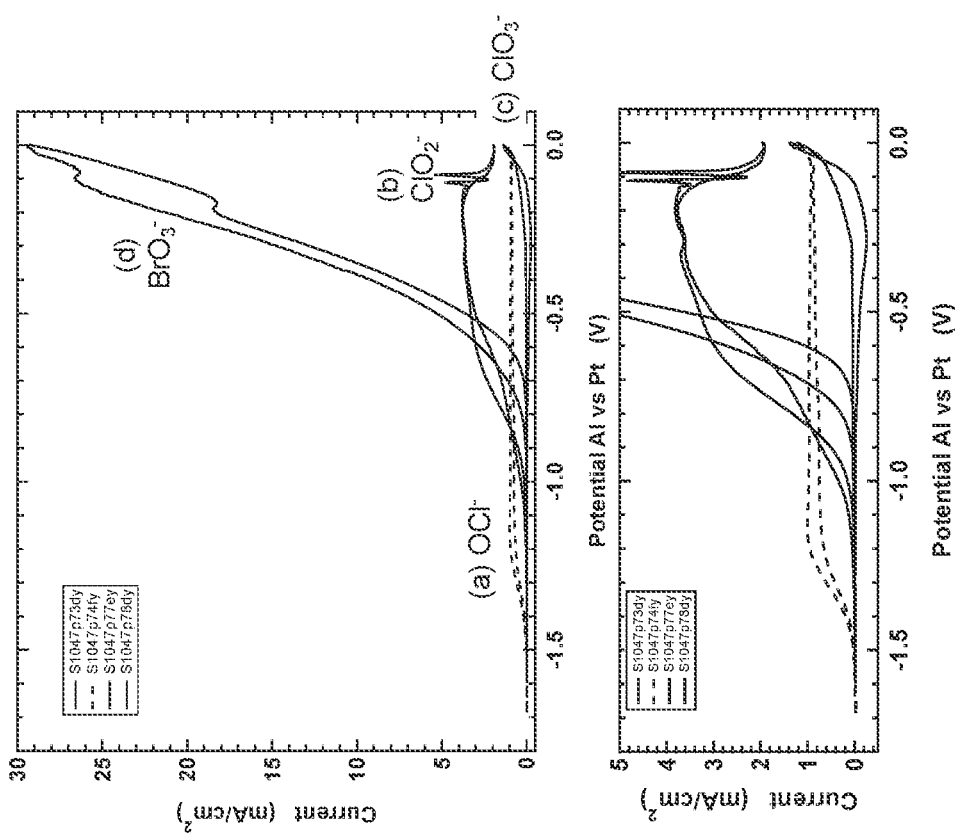
FIG. 12 shows the results of cyclic voltammetry scan of an electrochemical cell.

Electrochemical cells with Navalloy Al anodes and about 0.1 M $OCl^-$, $ClO_2^-$, $ClO_3^-$, and $BrO_3^-$ soluble anions of a respective cathode active material were tested with 40 g/liter sea water electrolyte. The cathode electrode was a 0.02 $cm^2$ Pt disk. The anode has a much larger surface area of about 1 $cm^2$. The cell performance was therefore cathode limited in order to illustrate the behavior of the different cathode materials. In addition, for this configuration, the Al anode was in direct contact with the soluble cathode material for ease of characterization. FIG. 12 shows cyclic voltammetry scans from approximately open circuit to 0 V (note that for these scans, the Pt cathode was utilized as the reference electrode, therefore, the potentials shown are negative). For $OCl^-$ (curve (a)), a current of about 1 mA/$cm^2$ is reached at 1.2 V, but the current does not increase further. For $ClO_2^-$ (curve (b)), the current reaches 2 mA/$cm^2$ at 0.7 V. For $ClO_3^-$ (curve (c)), there is little current even below 0.3 V, indicating a significant overpotential for the cathode material. For $BrO_3^-$ (curve (d)), there is about 1 mA/$cm^2$ at 0.7 V. The current increases significantly at lower voltages, however, these voltages may be too low for practical cells.

Figure 13:
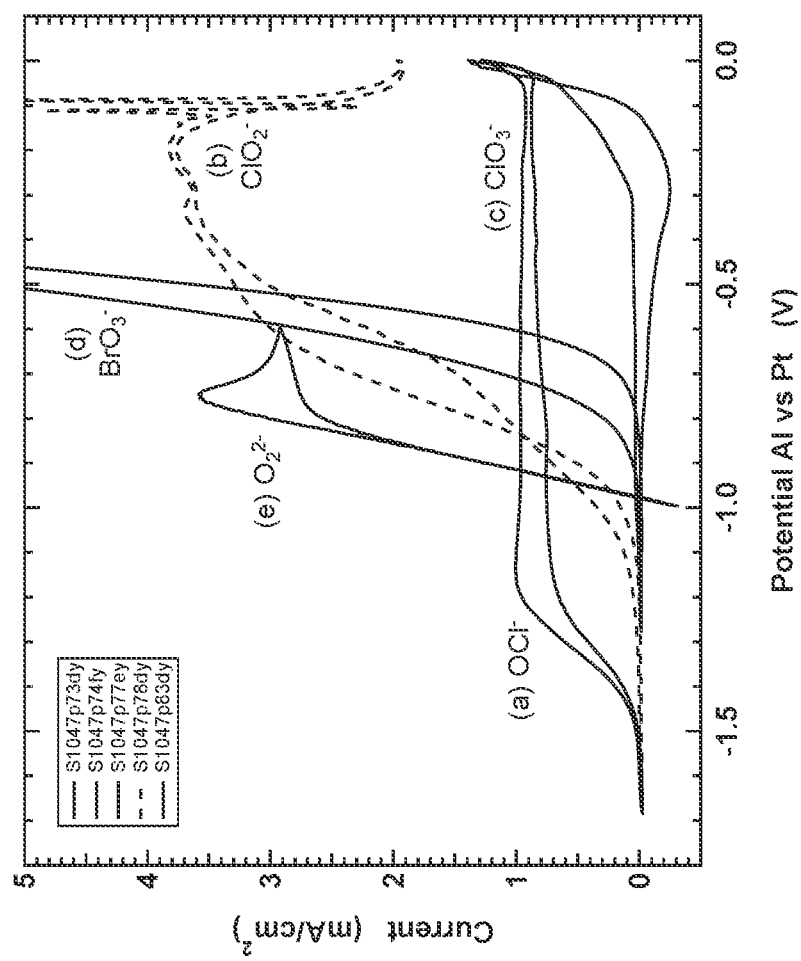
FIG. 13 shows the results of cyclic voltammetry scan of an electrochemical cell.

FIG. 13 shows the same soluble anion cathodes as FIG. 12 but with peroxide ($O_2^{2-}$) added (curve (e)). From an open circuit voltage of −1 V, the current increases immediately with no indication of an overpotential. The behavior also overlaps on the forward and reverse direction scans indicating little poisoning.

Stability of Aluminum Alloy Anode/Soluble Anion Cathode Cells

Figure 14:
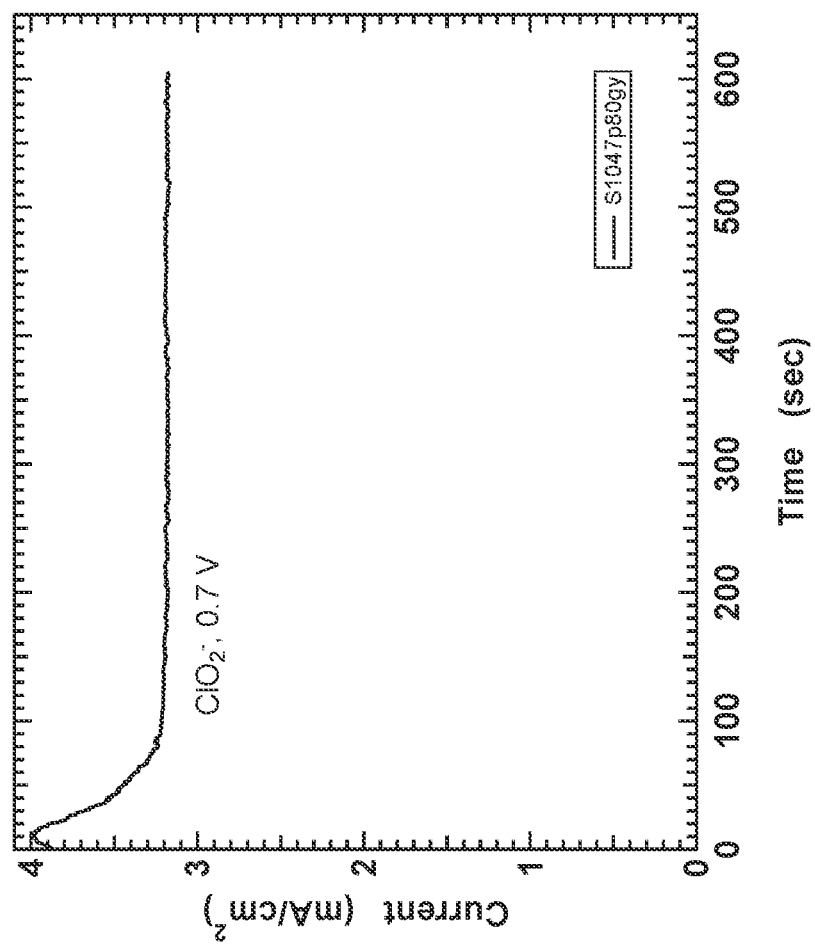
FIG. 14 shows the results of current vs. time scan at fixed potentials of an electrochemical cell.

FIG. 14 shows a similar cell as in FIG. 12 with $ClO_2^-$ as the soluble anion cathode material but run at fixed potentials. FIG. 14 shows the results run at 0.7 V. As can be seen from FIG. 14, the current is greater than 3 mA/cm² and is steady with little degradation over 600 sec.

Device(s) powered by electrochemical cell(s), controlling the electrochemical cell(s), forming the electrochemical cell(s) and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device(s) may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present invention.

While this invention has been described in detail with particular references to example embodiments thereof, the example embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. An electrochemical cell, comprising:
    a cathode comprising a porous scaffold and catalyst on the porous scaffold,
    an anode spaced apart from the cathode,
    a first liquid composition separated from the anode by the cathode, and
    a second liquid composition between the anode and the cathode,
    wherein the first liquid composition comprises an electrolyte solution and a salt, the salt comprising a cation and a first anion, the first anion being electrochemically reduced to a second anion when flowing through the cathode,
    the first anion comprises peroxide ($O_2^{2-}$), persulfate ($S_2O_8^{2-}$), hypochlorite ($OCl^-$), chlorite ($ClO_2^-$), chlorate ($ClO_3^-$), bromite ($BrO_2^-$), bromate ($BrO_3^-$), and/or iodate ($IO_3^-$), and
    the second liquid composition comprises the electrolyte solution and the second anion.

2. The electrochemical cell of claim 1, wherein
    the cathode has a first surface facing the first liquid composition and a second surface facing the second liquid composition, and
    an amount of the first anion decreases from the first surface to the second surface.

3. The electrochemical cell of claim 1, wherein in the second liquid composition, a molar ratio between the first anion and the second anion is from 0:100 to 10:90.

4. The electrochemical cell of claim 1, wherein the electrolyte solution comprises seawater.

5. The electrochemical cell of claim 1, wherein a pH of the second liquid composition is in a range of 5 to 8.

6. The electrochemical cell of claim 1, wherein a porosity of the porous scaffold is 40% to 98%, based on a total volume of the porous scaffold.

7. The electrochemical cell of claim 1, wherein the catalyst of the cathode comprises Pt and/or Ir.

8. The electrochemical cell of claim 1, wherein a surface area of the catalyst of the cathode is 500 cm² or greater per each cm² of a geometric surface area of the cathode.

9. The electrochemical cell of claim 8, wherein the surface area of the catalyst of the cathode is from 500 to 2,000 cm² per cm² of the geometric surface area of the cathode.

10. The electrochemical cell of claim 1, wherein the anode comprises magnesium (Mg), aluminum (Al), and/or zinc (Zn).

11. The electrochemical cell of claim 1, wherein the second anion comprises $SO_4^{2-}$, $Cl^-$, $Br^-$, $I^-$, and/or $OH^-$.

12. The electrochemical cell of claim 1, wherein the porous scaffold is 1 mm to 100 mm in thickness.

13. The electrochemical cell of claim 1, further comprising:
    a pump structure configured to pass the first liquid composition though the porous scaffold.

14. An electrochemical cell, comprising:
    a cathode comprising a porous scaffold and catalyst on the porous scaffold,
    an anode spaced apart from the cathode,
    a first liquid composition separated from the anode by the cathode, and
    a second liquid composition between the anode and the cathode,
    wherein the first liquid composition comprises an electrolyte solution and a salt, the salt comprising a cation and a first anion, the first anion being electrochemically reduced to a second anion when flowing through the cathode,
    the first anion comprises peroxide ($O_2^{2-}$), persulfate ($S_2O_8^{2-}$), hypochlorite ($OCl^-$), chlorite ($ClO_2^-$), chlorate ($ClO_3^-$), bromite ($BrO_2^-$), bromate ($BrO_3^-$), and/or iodate ($IO_3^-$),
    the second liquid composition comprises the electrolyte solution and the second anion, and the porous scaffold is an ordered microtruss structure or a carbon aerogel structure.

\* \* \* \* \*